July 19, 1927.
A. J. FISHER
1,636,176
WASHING MACHINE CASING
Filed Nov. 17, 1919
7 Sheets-Sheet 1
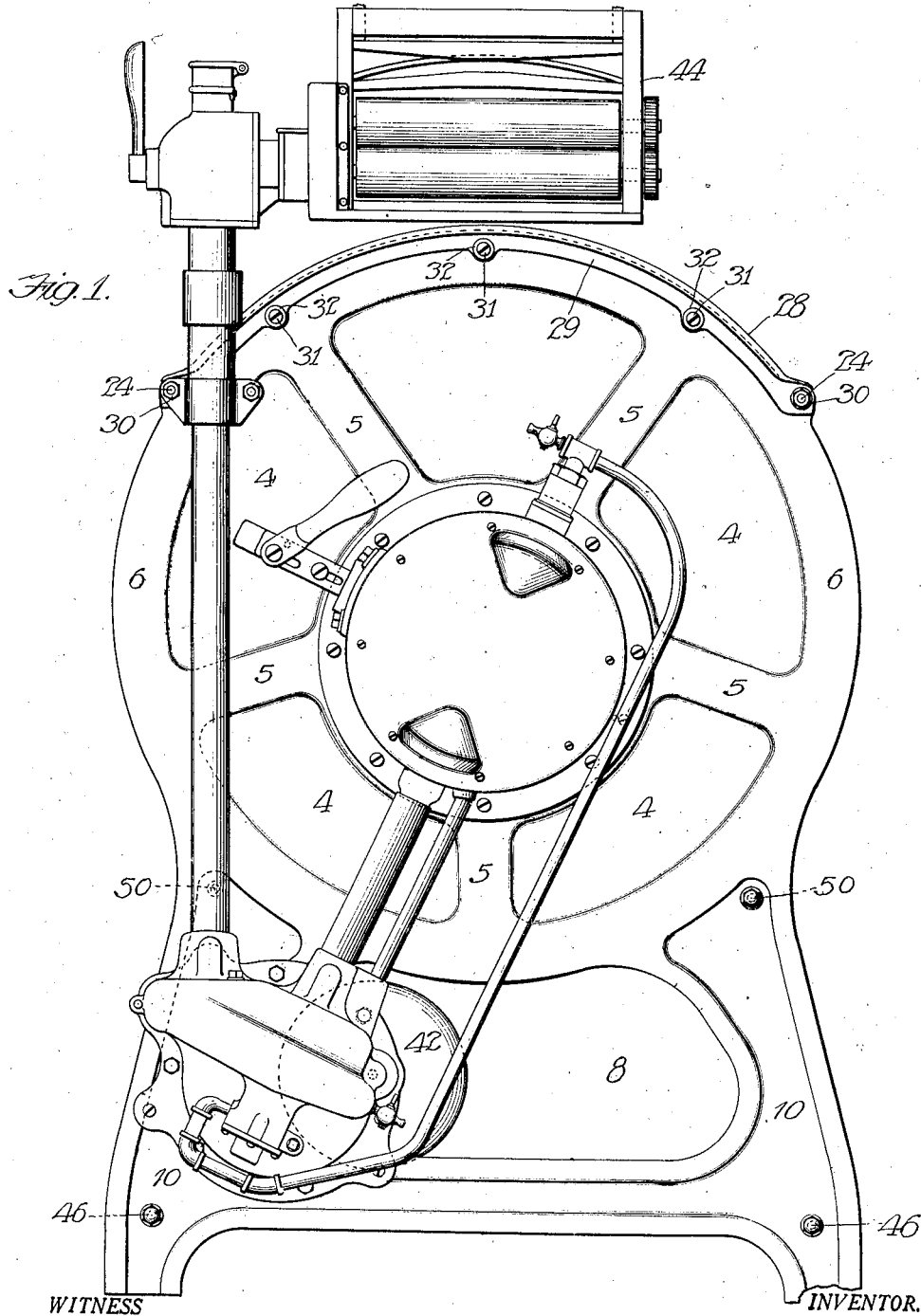
WITNESS
Martin H. Olsen.
INVENTOR.
Alva J. Fisher
BY Rector, Hibben, Davis & Macauley
His ATTORNEYS.

July 19, 1927.
A. J. FISHER
WASHING MACHINE CASING
Filed Nov. 17, 1919
1,636,176
7 Sheets-Sheet 2
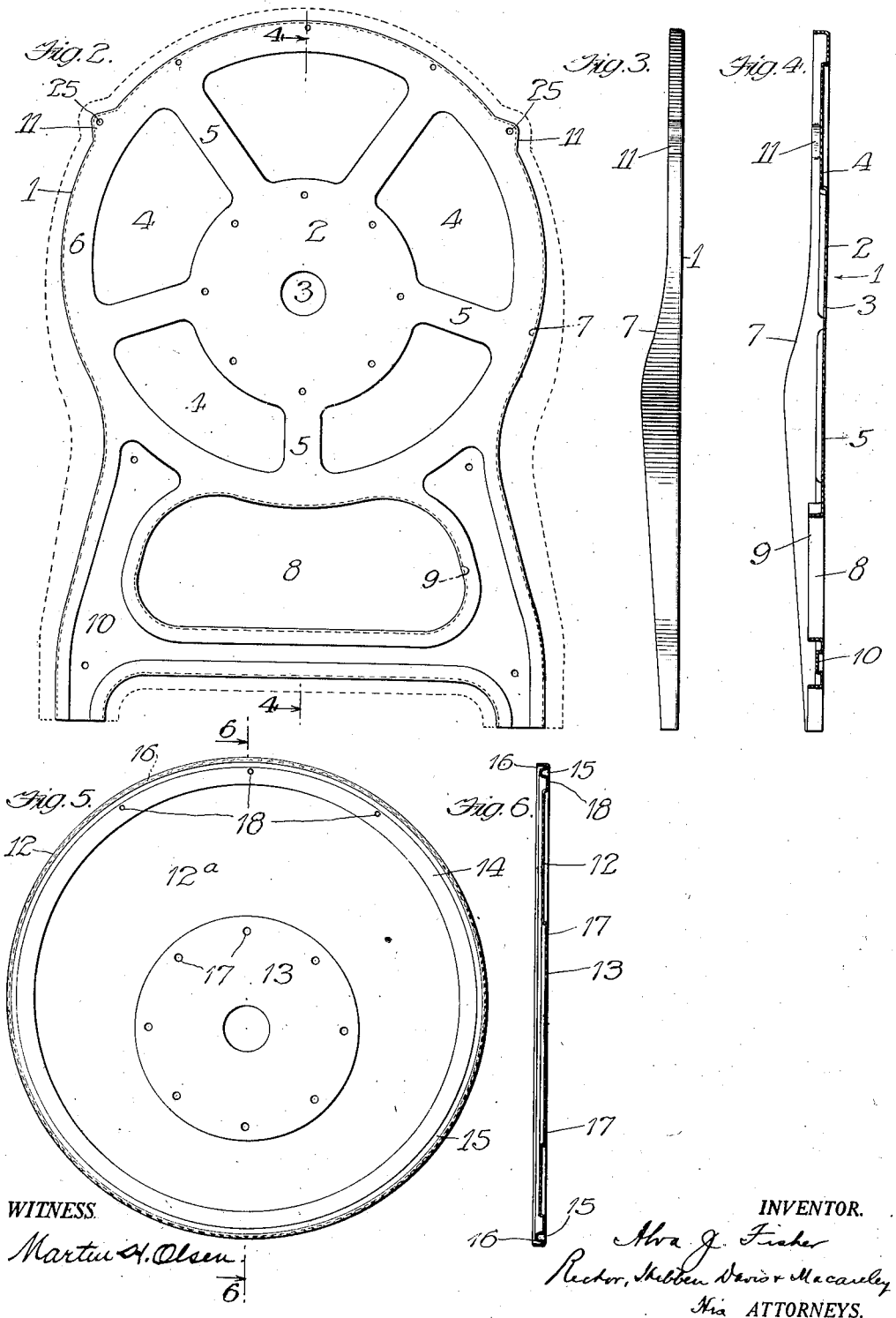
WITNESS
Martin H. Olsen
INVENTOR.
Alva J. Fisher
Rector, Hibben, Davis & Macauley
His ATTORNEYS.

July 19, 1927.
A. J. FISHER
WASHING MACHINE CASING
Filed Nov. 17, 1919
1,636,176
7 Sheets-Sheet 3
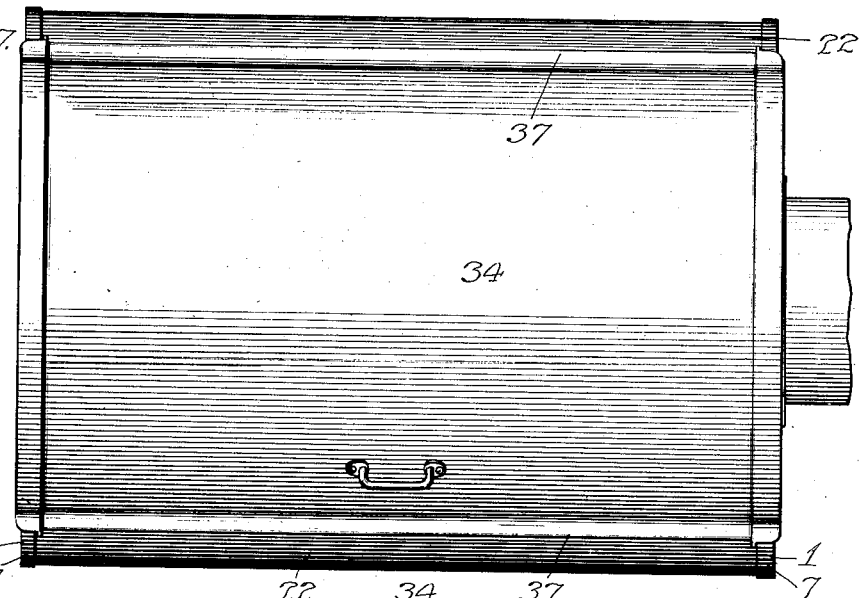
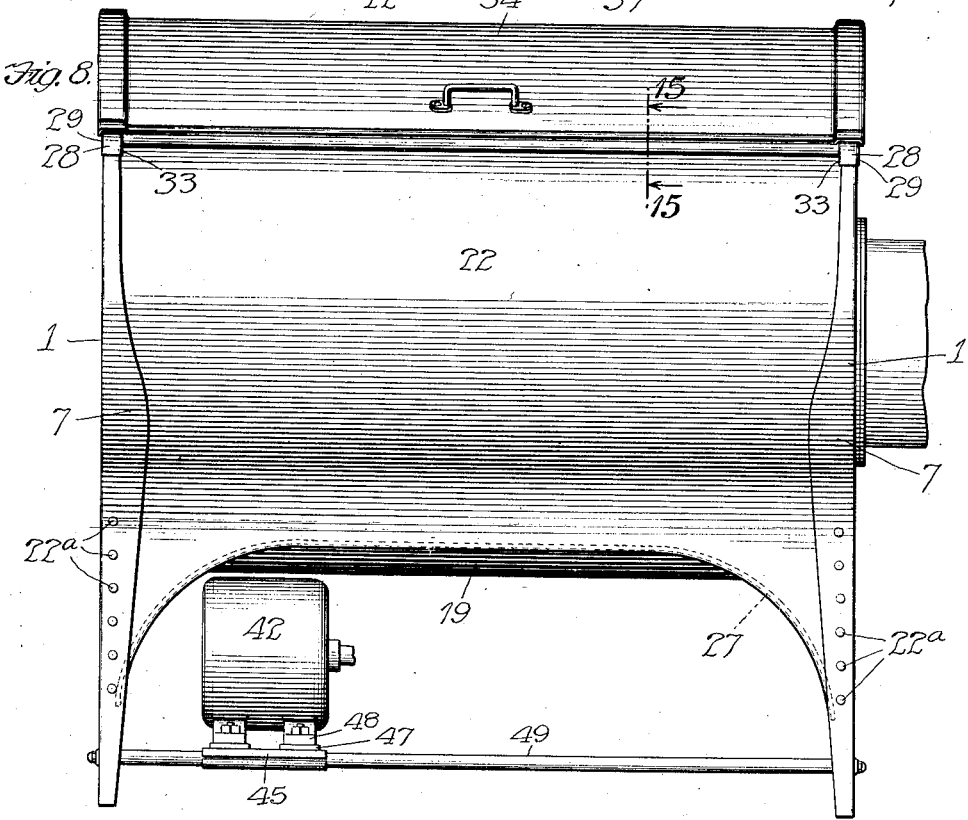

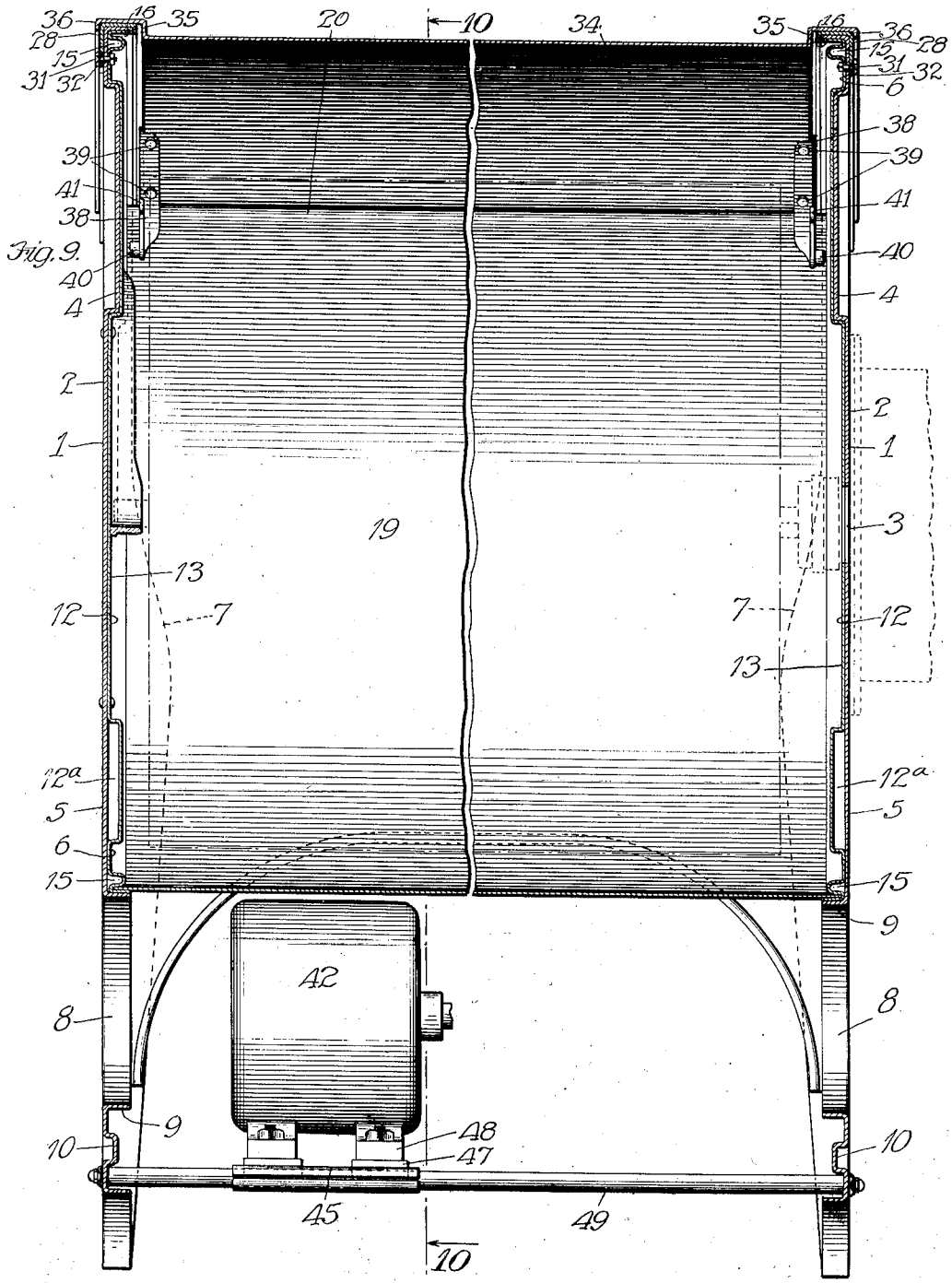

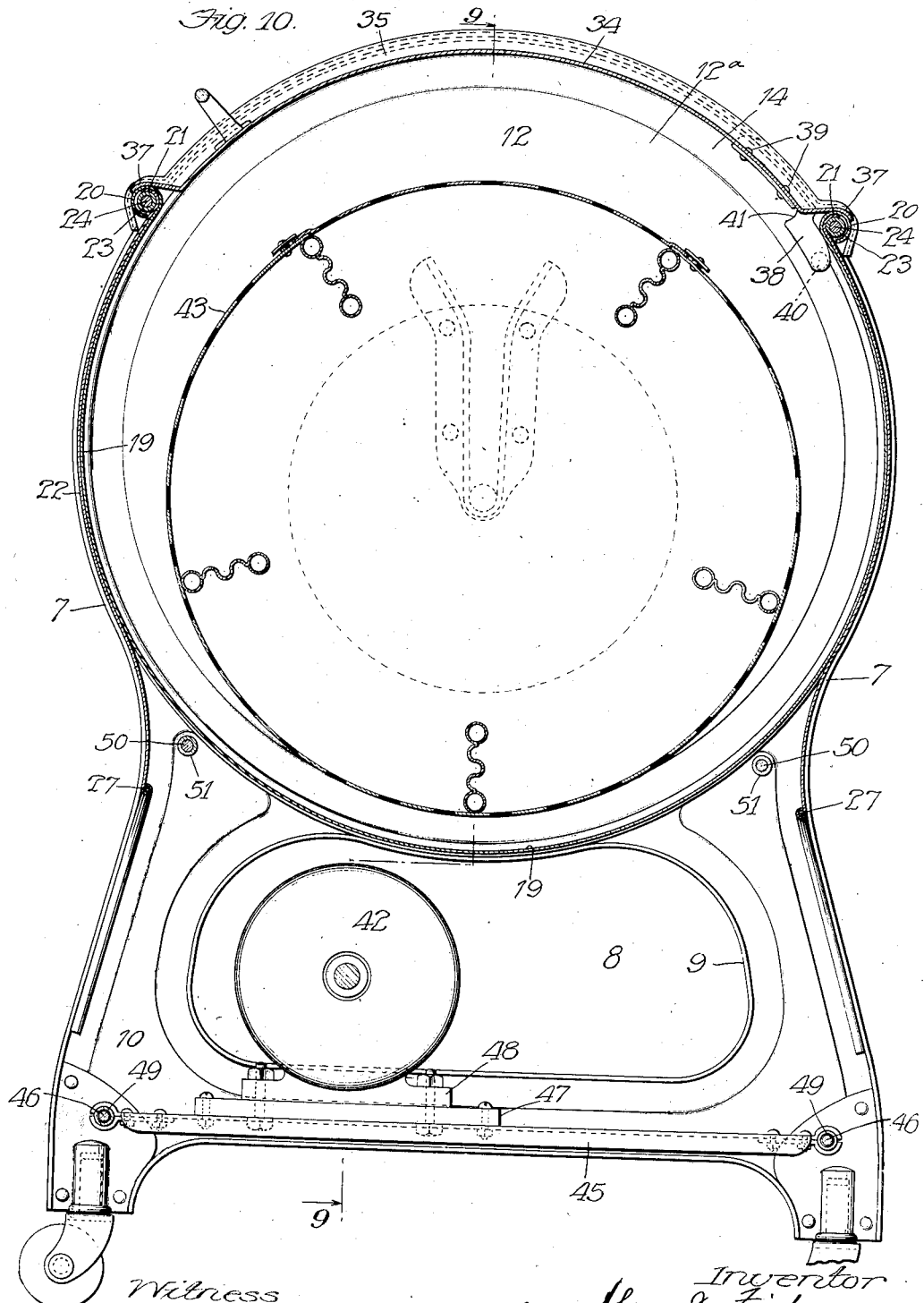

July 19, 1927.
A. J. FISHER
1,636,176
WASHING MACHINE CASING
Filed Nov. 17, 1919
7 Sheets-Sheet 6
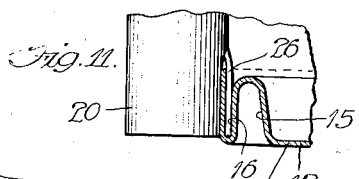
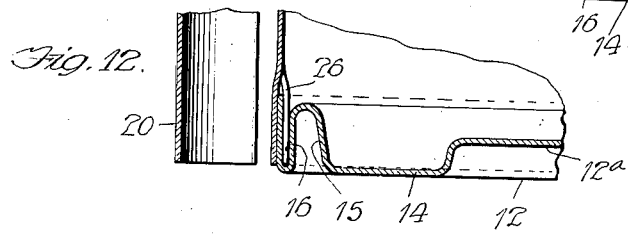
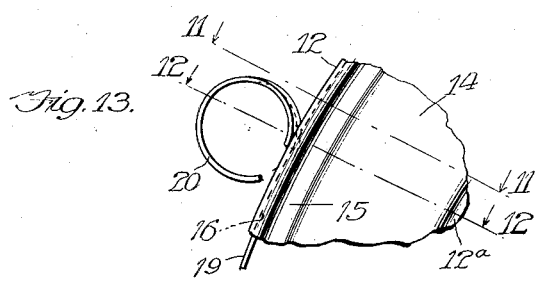
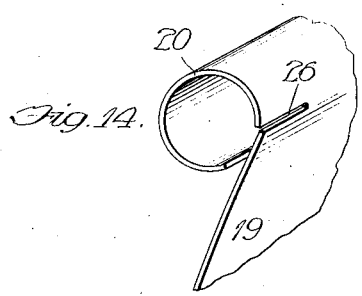
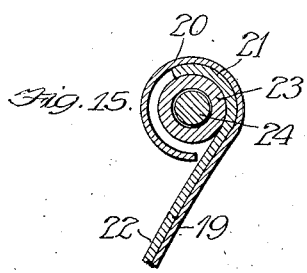
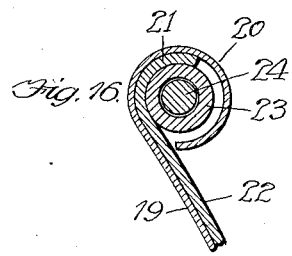

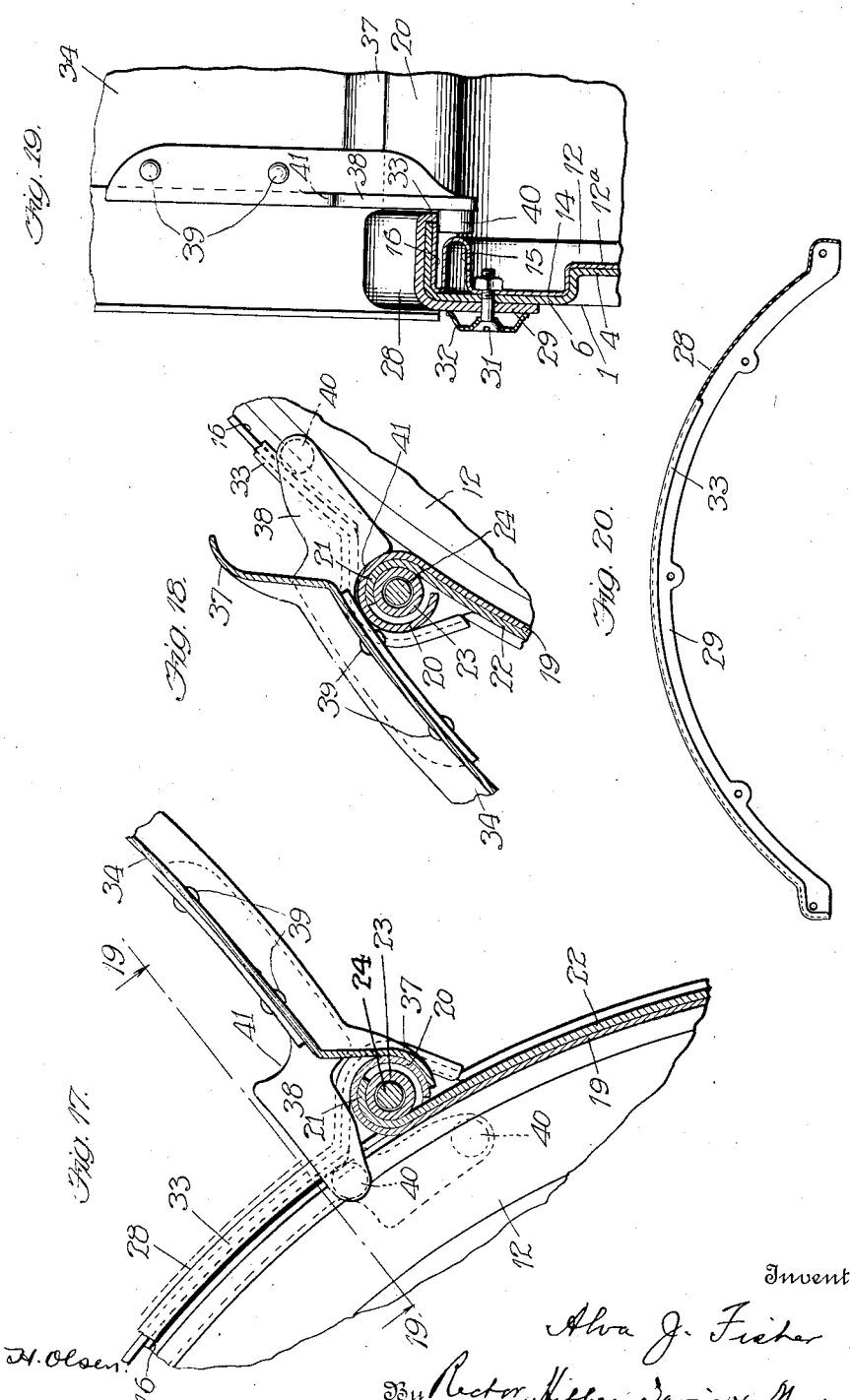

Patented July 19, 1927.

1,636,176

UNITED STATES PATENT OFFICE.

ALVA J. FISHER, OF EVANSTON, ILLINOIS, ASSIGNOR TO HURLEY MACHINE COMPANY, OF CHICAGO, ILLINOIS, A CORPORATION OF ILLINOIS.

WASHING-MACHINE CASING.

Application filed November 17, 1919. Serial No. 338,511.

My invention relates to washing machines of the general type illustrated in my Patent No. 1,181,379, dated May 2, 1916, and the object thereof is to produce a stamped metal construction of machine which embodies many practical and commercial advantages. The structure of the washing machine more particularly the main frames and the washing receptacle or tub are made from sheet metal and are so designed and constructed that they can be made from sheet metal pressed out by dies so that such parts may be produced in large quantities with great economy and with absolute exactness. Moreover, the various parts are so constructed that they can be readily and economically assembled either at the factory where produced or elsewhere such as a distributing point where the assembling may be as well performed as at the factory, even as to whatever soldering is required inasmuch as provision has been made for the ordinary character of soldering as distinguished from such work as would require special soldering machinery or special assembling machines.

Various features of advantage in my new construction of washing machine will be apparent from the description hereinafter given. In the drawings Fig. 1 is an elevation of my new machine complete with its operating mechanism; Fig. 2 an elevation of one of the end frames by itself showing in dotted lines the configuration of the plate before its margin has been bent to form; Fig. 3 an edge view of the frame looking at the left hand edge thereof; Fig. 4 a section on the line 4—4 of Fig. 2; Fig. 5 an elevation of one of the ends of the cylindrical tub, the side or face shown being the inside face; Fig. 6 a section on the line 6—6 of Fig. 5; Fig. 7 a top plan view of the tub and end frames; Fig. 8 a side elevation thereof; Fig. 9 a vertical section on the line 9—9 of Fig. 10; Fig. 10 a vertical section on the line 10—10 of Fig. 9; Figs. 11 and 12 sections on the lines 11—11 and 12—12 respectively of Fig. 13 showing details of construction; Fig. 13 an elevation of such details; Fig. 14 a perspective of a portion of such detail; Fig. 15 a section on its line 15—15 of Fig. 8 looking in the direction of the arrows; Fig. 16 a similar section but looking in the opposite direction: Fig. 17 a detail section showing the tub cover in raised position; Fig. 18 a detail section showing such cover in its forwardly slid or open position; Fig. 19 a section on the line 19—19 of Fig. 17; and Fig. 20 a detail view of a binding strip.

For the sake of a clear and definite description of my invention I have shown the same as embodied in that type and general construction of washing machine as illustrated in my patent aforesaid, but it will be understood that my invention is not limited to any particular construction of machine, whether power driven or not, and also that the character of the operating parts of machinery connected therewith is immaterial. Therefore with the understanding that my invention may partake of different forms of embodiment and that the present embodiment is selected as one whereby to clearly define the invention, I will proceed to describe such embodiment as follows:

The portions of the washing machine with which my invention is more particularly concerned comprise two main frames or standards and a washing receptacle or tub located and supported therebetween, together with two opposite side plates or portions and a cover or lid for the tub.

The two end frames 1 are identical in construction and configuration, the same being stamped by dies from suitable sheet metal into the form illustrated in Figs. 2, 3 and 4. Each frame comprises an upper circular portion and a lower irregular portion, the latter being adapted to rest upon the floor or other support through the medium of castors. Such circular portion is in line with and partakes of the circular or cylindrical formation of the tub hereinafter described. Speaking specifically, such circular portion comprises the circular center 2 having a center opening 3 to receive the operating shaft of the power drive mechanism. Within this circular portion 2, there is a series of depressions 4 with intervening radial ribs 5 forming a circular rim 6 whereby the sheet metal is materially strengthened. Moreover, the sheet is bent at its margin to form the flange 7 thereby still further strengthening the sheet.

The preferred form of the flange 7 is illustrated in Figs. 3 and 4 wherein it is seen that the same widens from its bottom to its intermediate portion and then tapers to a plane parallel to the outer face of the sheet or frame. The lower portion of each end frame is provided with an elongated opening 8 having inturned marginal flanges 9. This lower portion is also provided with inwardly depressed portions 10. The rim 6 is provided at opposite sides with ears 11 extending outwardly beyond the general contour of such rim and adapted to cooperate with the upper edges of the tub and also with the cover or lid as hereinafter described.

Next referring to the tub construction the same consists of similar circular end plates and a body portion which is cylindrical except for a portion cut away in order to accommodate the cover. Referring to the end plates, they are identically the same and when detached appear as in Fig. 5. As shown, each plate 12 is made of sheet metal pressed by dies into the form illustrated by Figs. 5 and 6 wherein it is seen that an annular portion 12$^a$ is pressed outwardly from the plane of the sheet leaving the substantially central portion 13 and the rim 14 in such plane. The extreme margin of the sheet beyond the rim portion 14 is reversely bent to form the two oppositely directed grooves 15 and 16.

Each of the end plates of the tub fits its end frame, the central portion 13 fitting accurately within the substantially central portion of the end frame as formed by the depressions 4, and the edges of such tub ends being received within the flange formed at the margin of the rim 6. Each end plate is secured to its frame in suitable manner as by bolts or rivets, preferably the latter passing through the holes 17 at the central portions and the holes 18 at the marginal portions. This fitting of the end plates and their frame is illustrated in detail in Fig. 9.

Referring to the body or sides of the tub the same is substantially cylindrical except for the upper portion, which is open but adapted to be closed by the cover. As shown in Fig. 10 the body of the tub comprises a substantially cylindrical sheet metal plate 19 whose upper edges 20 are wraped or turned over the corresponding top edges 21 of the side aprons 22 of the machine and also over a tube 23 and a transverse rod 24 which latter connects between the ears 11 of the end frames, the same passing through the holes 25 in such ears. The end edges of the sheet 19 are received within the flanges 16 of the end plates as shown in Fig. 9 and this joint is properly soldered when the parts are assembled. The joint is made very simple and efficient and capable of being soldered by an ordinary workman, whereby the need of an expert operator and the use of special machines or supports or soldering machines are dispensed with.

As shown in Fig. 9, the end flanges of the end plates are made a little higher or wider than the apex of the grooved portions 15, so that in the assembling of the plates, the cylinder plates will strike against it and readily find and enter the grooves 16. Thus such flanges act as locators or pilots and also holders to facilitate the assembling operation.

In order to accommodate and receive the end edges of the end plates 12 the plate 19 is horizontally slit at its top portions and at opposite sides and ends, where the rolled over portion begins as at 26. This construction and the resulting joints are shown in detail in Figs. 11 to 14.

The two side plates or aprons 22 have their lower curved edges rolled over the curved or arched rods 27 whose ends are secured to the opposite end frames. These side plates extend upwardly in substantially parallel relationship to the opposite sides of the tub body, Fig. 10. The top edges of these plates are rolled over upon the transverse distance tubes 23 through which rods 24 pass and it is over these rolled over edges that the upper edges of the tub body are rolled, Figs. 15 and 16.

The apron plates perform an important function in that they effectually strengthen the structure by reason of the fact that they fit closely in the angles of the end frames, thereby materially relieving the tie rods of strain. Moreover, the tub rests within without any strain whatever on it. In order to make the structure still stronger, screws or rivets as shown at 22$^a$ may be used to secure the leg portions of the end plates and the apron plates together.

As shown in Figs. 1 and 9 the top edges of the end plates and end frames adjacent the opening of the tub are bound and protected by an arc shaped plate 28, having a rather deep outside flange 29 bearing against the end frames and secured thereto in suitable manner, but preferably at the extreme ends by means of the nuts 30, screwing onto the ends of the transverse rods 24 at each side of said tub opening and also by the series of screws 31 which are preferably provided with a spring washer device 32 made separate from or as a part of the flange 29. The detail of such latter construction is shown in Fig. 19. This plate 28 has on its inside a short flange 33 which fits over the inside edges of the tub, inwardly directed flanges of the end plates and the end frames. One of the principal functions of these two plates 28 is not only to bind the top ends of the end plates and frames but to provide a protection thereto and a strip upon which the lid may slide and contact when in its closed position. These plates 28 are made of metal preferably nickel plated, whereas the remainder of the metal work of the structure is enameled or glazed which surface would be marred or destroyed by the movements and contacts of the lid or cover. Moreover, it has been found difficult in practice to perfectly glaze the top flanged edges of the end plates as the glazing sometimes chips off or blisters in places, with the result that these binding plates of non-rusting material serve also to conceal all imperfections and give perfect finish thereto.

The lid or cover 34 comprises an arc shaped plate of sheet metal having its end edges flanged as shown in section in Fig. 9, wherein it is seen that end channels are formed by the two right angled flanges 35 and 36 which channels embrace the plates 28 and the tops of the end plates and frames, the same forming tracks or guides on which such cover may slide. It is necessary that these tracks be parallel or in horizontal alinement, which result is accomplished by the above mentioned character of fitting of the apron plates and the end frames or plates.

As shown in detail in Figs. 17 to 19 the rearward and horizontal edge of the cover is curved outwardly and downwardly as at 37 so as to form somewhat of a socket to cooperate with the tubular portion formed by the rolled over ends of the plates 19 and 22, such parts in their cooperation acting as a loose hinge for the lid. The lid at its two rearward corners is provided with a plate 38 secured thereto in suitable manner as by screws or rivets 39. Projecting laterally and outwardly from the lower ends of these plates are two pins 40 which are adapted to engage under and cooperate with the under face of the flanges 16 of the end plates 12 whenever such lid is raised to its full open position as shown in Fig. 17, at which time such face is contacted by the pins and the pivotal movement of the lid thereby stopped.

The lid is adapted not only to be tilted to the position shown in Fig. 17 but also to be bodily slid forward and allowed to hang suspended at the front of the machine when its further sliding movement is stopped by the contact of the curved top edges 41 against the tubular or rolled over portions 20 and 21 at the front side of the machine as is clearly shown in Fig. 18. By slightly raising the lid and turning the same sideways so as to disengage the pins 40 the lid may be bodily removed from the machine.

The actuating motor 42 which drives the operating parts shown at one end of the machine in Fig. 1 for driving the cylinder 43 shown in Fig. 10 and the wringer 44 shown in Fig. 1, is mounted upon a support arranged below the tub as seen in Figs. 1, 9 and 10. This support consists of a sheet metal platform 45 which is secured at its ends to the transverse tie rods 46 passing through the lower ends of the end frames of the machine. Upon this platform there is mounted the blocks 47 and 48 upon the latter of which the motor is directly mounted, these blocks and platform being provided with means for adjusting the position of the motor. These tie rods are provided with tubes 49 which serve as distance members between the end frames. Additional tie rods 50 and distance tubes 51 are provided at an intermediate position on the end frames, Figs. 1 and 10.

I claim:

1. A stamped metal washing machine casing comprising a substantially cylindrical tub composed of a curved body plate and end plates of sheet metal, end frames of sheet metal detachably interlocked with the end plates and adapted to support said tub and means cooperating with the end frames for holding them in position and in connection with the end plates.

2. A stamped metal washing machine casing comprising a substantially cylindrical tub composed of a curved body plate and end plates of sheet metal, and end frames of sheet metal adapted to support said tub, said frames and end plates being correspondingly embossed to interlock with each other.

3. A stamped metal washing machine casing comprising a substantially cylindrical tub composed of a curved body plate of sheet metal and end plates of sheet metal having reversely flanged margins to form grooves to receive the end edges of the body plate, end frames of sheet metal for supporting said tub and tie rods connecting the end frames and holding them against the end plates.

4. A stamped metal washing machine casing comprising a substantially cylindrical tub composed of a curved body plate of sheet metal less than a circle in cross section with its upper edges rolled over and provided with marginal slits at such rolled over portion, and circular end plates of sheet metal having reversely flanged margins to form grooves to receive the end edges of the body plate, said flanged margins entering said slits.

5. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates circumferentially thereof and then adapted to engage the opposite edge of such body plate.

6. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates circumferentially thereof and then adapted to engage the opposite edge of such body plate said lid having means to engage the end plates to limit the pivotal movement of the lid.

7. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates circumferentially thereof and then adapted to engage the opposite edge of such body plate, said lid having at its rearward edge projecting pins to engage the end plates to limit the pivotal movement of the lid.

8. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates circumferentially thereof and then adapted to engage the opposite edge of such body plate, said end plates having inwardly directed flanges and the lid having laterally projecting pins to engage the flanges of the plate to limit the pivotal movement of the lid.

9. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates and then adapted to engage the opposite edge of such body plate, the horizontal edges of such body plate being rolled over to form tubular portions thereat, said lid having its rearward edge flanged or curved to loosely pivot upon one of such tubular portions and to slide bodily upon the top edges of the said plates and engage the other tubular portion, said lid being slidable circumferentially upon said plates and having a fixed relation thereto longitudinally.

10. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates and then adapted to engage the opposite edge of such body plate, the horizontal edges of such body plate being rolled over to form tubular portions thereat, said lid being loosely pivoted upon the rearward one of such tubular portions and having a projecting plate adapted to engage the forward one of such tubular portions when the lid is slid bodily forward.

11. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edge of the end plates and then adapted to engage the opposite edge of such body plate, the horizontal edges of such body plate being rolled over to form tubular portions thereat, said lid being loosely pivoted upon the rearward one of such tubular portions, and having a projecting plate provided with lateral pins adapted to contact the end plates to limit the pivotal movement of the lid, said plate being in position to engage the forward one of such tubular portions when the lid is slid bodily forward.

12. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates and then adapted to engage the opposite edge of such body plate, the horizontal edges of such body plate being rolled over to form tubular portions thereat, said lid having its rearward edge flanged or curved to loosely pivot upon one of such tubular portions and to slide bodily upon the top edges of the said plates and engage the other tubular portion, said lid having its end edges channeled to fit upon and engage the top edges of the end plates.

13. A stamped metal washing machine casing comprising a substantially cylindrical tub composed of a curved body plate of sheet metal less than a circle in cross section, circular end plates of sheet metal secured to said body plate, and a lid loosely pivoted to one horizontal edge of the body plate and slidable bodily upon the top edges of the end plates and then adapted to engage the opposite edge of such body plate, binding plates secured to the top edges of the end plates, said lid being loosely pivoted on the horizontal edge of the body plate and slidable bodily upon the binding plates.

14. A washing machine casing comprising a body plate provided with an opening, a lid for closing said opening, and connecting means attached to said lid for permitting pivotal movement of said lid about one edge of said opening and for permitting a sliding movement of said lid along the sides of said opening from said edge thereof toward the opposite edge of said opening.

15. A washing machine casing comprising a substantially cylindrical tub composed of a curved body plate having an opening, end plates of sheet metal secured thereto, and a lid of the shape of said opening and curved substantially to the shape of said body plate, said lid being pivotally carried by and slidably mounted on the top edges of the end plates at the sides of said opening.

16. A washing machine casing comprising a substantially cylindrical tub composed of a curved body plate having an opening, end plates of sheet metal secured thereto, and a lid of the shape of said opening and curved substantially to the shape of said body plate, said lid being pivotally carried by and slidably mounted on the top edges of the end plates, said lid and plates having cooperating means for limiting such pivotal movement of the lid.

17. A washing machine casing comprising a substantially cylindrical tub having a curved body plate provided with an opening, end plates secured thereto, a lid for closing said opening, and pivots for said lid having a sliding engagement with said tub at the ends of said opening for permitting independent pivotal movement of one edge of said lid about one edge of said opening and a forward sliding movement of said lid across said opening from said edge about which pivotal movement takes place toward the opposite edge of said opening.

ALVA J. FISHER.